(12) United States Patent
Moore et al.

(10) Patent No.: US 7,792,882 B2
(45) Date of Patent: Sep. 7, 2010

(54) METHOD AND SYSTEM FOR BLOCK ALLOCATION FOR HYBRID DRIVES

(75) Inventors: William H. Moore, Fremont, CA (US);
Darrin P. Johnson, San Jose, CA (US);
George R. Wilson, Brisbane, CA (US)

(73) Assignee: Oracle America, Inc., Redwood City, CA (US)

( * ) Notice: Subject to any disclaimer, the term of this patent is extended or adjusted under 35 U.S.C. 154(b) by 329 days.

(21) Appl. No.: 11/863,197

(22) Filed: Sep. 27, 2007

(65) Prior Publication Data
US 2009/0089343 A1 Apr. 2, 2009

(51) Int. Cl.
*G06F 12/00* (2006.01)
*G06F 17/30* (2006.01)

(52) U.S. Cl. .................. 707/822; 707/999.205
(58) Field of Classification Search ............ None
See application file for complete search history.

(56) References Cited

U.S. PATENT DOCUMENTS

| | | | |
|---|---|---|---|
| 4,144,522 A | 3/1979 | Kageyama et al. |
| 5,129,085 A | 7/1992 | Yamasaki et al. |
| 5,155,847 A | 10/1992 | Kirouac et al. |
| 5,371,885 A | 12/1994 | Letwin |
| 5,403,639 A | 4/1995 | Belsan et al. |
| 5,410,667 A | 4/1995 | Belsan et al. |
| 5,675,802 A | 10/1997 | Allen et al. |
| 5,819,292 A | 10/1998 | Hitz et al. |
| 6,209,111 B1 | 3/2001 | Kadyk et al. |
| 6,341,341 B1 | 1/2002 | Grummon et al. |
| 6,728,922 B1 | 4/2004 | Sundaram et al. |
| 6,745,284 B1 | 6/2004 | Lee et al. |
| 6,745,305 B2 | 6/2004 | McDowell |
| 6,795,966 B1 | 9/2004 | Lim et al. |
| 6,829,617 B2 | 12/2004 | Sawdon et al. |
| 6,857,001 B2 | 2/2005 | Hitz et al. |

(Continued)

OTHER PUBLICATIONS

Austin, B.; "A Dynamic Disc Allocation Algorithm Designed to Reduce Fragmentation During File Reloading"; Information Sciences Laboratory, Corporate Research and Development Center, General Electric Company, 1970 (4 pages).

(Continued)

*Primary Examiner*—Kuen S Lu
*Assistant Examiner*—Tuan Pham
(74) *Attorney, Agent, or Firm*—Osha • Liang LLP

(57) ABSTRACT

A method for priority-based allocation in a storage pool, involving receiving a first request to write a first data item in the storage pool, wherein the storage pool includes a first hybrid drive including a first plurality of metaslabs associated with a first storage type and a second plurality of metaslabs associated with a second storage type, selecting a first target metaslab from the first and second plurality of metaslabs based on a first plurality of allocation priorities, wherein the first plurality of allocation priorities are determined using a storage and power management policy, a storage characteristic, and a power characteristic associated with the first storage type and the second storage type in the first hybrid drive, allocating a first block to the first target metaslab, and writing the first block to the first target metaslab, wherein the first block includes a first portion of the first data item.

13 Claims, 11 Drawing Sheets

U.S. PATENT DOCUMENTS

| | | | |
|---|---|---|---|
| 6,892,211 | B2 | 5/2005 | Hitz et al. |
| 7,007,196 | B2 | 2/2006 | Lee et al. |
| 7,032,154 | B2 | 4/2006 | Kidorf et al. |
| 7,043,677 | B1 | 5/2006 | Li |
| 7,133,964 | B2 | 11/2006 | Rodrigues et al. |
| 7,162,486 | B2 | 1/2007 | Patel et al. |
| 7,174,352 | B2 | 2/2007 | Kleiman et al. |
| 7,200,715 | B2 | 4/2007 | Kleiman et al. |
| 7,225,211 | B1* | 5/2007 | Colgrove et al. ............ 707/205 |
| 7,392,362 | B2* | 6/2008 | Yamauchi et al. ........... 711/170 |
| 2002/0004883 | A1 | 1/2002 | Nguyen et al. |
| 2002/0055942 | A1 | 5/2002 | Reynolds |
| 2002/0087788 | A1 | 7/2002 | Morris |
| 2002/0161972 | A1 | 10/2002 | Talagala et al. |
| 2003/0033477 | A1 | 2/2003 | Johnson et al. |
| 2003/0126107 | A1 | 7/2003 | Yamagami |
| 2003/0145167 | A1* | 7/2003 | Tomita ...................... 711/114 |
| 2003/0182494 | A1* | 9/2003 | Rodrigues et al. .......... 711/100 |
| 2003/0188090 | A1* | 10/2003 | Darnell et al. .............. 711/108 |
| 2004/0098720 | A1 | 5/2004 | Hooper |
| 2004/0107314 | A1 | 6/2004 | Kim et al. |
| 2004/0123063 | A1 | 6/2004 | Dalal et al. |
| 2004/0225834 | A1 | 11/2004 | Lu et al. |
| 2004/0234000 | A1 | 11/2004 | Page |
| 2004/0267897 | A1* | 12/2004 | Hill et al. .................... 709/217 |
| 2005/0010620 | A1* | 1/2005 | Silvers et al. ............... 707/205 |
| 2005/0097270 | A1 | 5/2005 | Kleiman et al. |
| 2005/0144486 | A1* | 6/2005 | Komarla et al. ............ 713/300 |
| 2005/0149940 | A1* | 7/2005 | Calinescu et al. .......... 718/104 |
| 2005/0235154 | A1 | 10/2005 | Serret-Avila |
| 2006/0218644 | A1 | 9/2006 | Niles et al. |

OTHER PUBLICATIONS

Goodheart, B. et al.; "The Magic Garden Explained"; Prentice Hall, 1994 (8 pages).

Stallings, W.; "Computer Organization and Architecture: Designing for Performance"; Prentice Hall, 2000 (4 pages).

Sandberg, R. et al.; "Design and Implementation of the Sun Network Filesystem"; Sun Microsystems, Inc., 1985 USENIX Conference (12 pages).

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"VERITAS File System 3.4 Administrator's Guide" VERITAS Software Corporation, Nov. 2000, http://www.veritas.com; pp. 1-227 (227 pages).

Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).

Osorio, N. et al.; "Guidelines for Using Snapshot Storage Systems for Oracle Databases"; Oracle Corporation, Oct. 2001 (13 pages).

Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).

Sun StorEdge Instant Image 2.0 System Administrator's Guide; Sun Microsystems, Inc., Feb. 2000, Revision A (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The LOCUS Distributed System Architecture"; The MIT Press, Cambridge, Massachusetts, 1985 The Massachusetts Institute of Technology (8 pages).

Gray, J. et al.; "The Recovery Manager of the System R Database Manager"; Computing Surveys, vol. 13, No. 2, Jun. 1981 (20 pages).

Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am May 23, 1991 an der TU Berlin, and English Translation (245 pages).

Ylonen, T. et al.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).

"The Enterprise Challenge Served by Snapshot"; Whitepaper, 2001 LSI Logic Corporation (8 pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistent Snapshots"; Department of Computer Science and Automation, Indian Institute of Science, Bangalore—560 012, Jan. 2000 (38 pages).

"Proceedings of the 5th Annual Linux Showcase & Conference" USENIX Association, Oakland, California, Nov. 5-10, 2001 (11 pages).

Borg, A. et al.; "Fault Tolerance Under UNIX"; ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, Univeristy of California, 1991 (15 pages).

Hecht, M. S. et al.; "Shadowed Management of Free Disk Pages with a Linked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

Johnson, J. E. et al.; "Overview of the Spiralog File System", Digital Technical Journal, vol. 8, No. 2, 1996, pp. 5-14 (10 pages).

Santry, D. S. et al.; "Deciding When to Forget in the Elephant File System"; 17th ACM Symposium on Operating Systems Principles (SOSP '99), Dec. 1999; pp. 110-123 (14 pages).

Chutani, S. et al., "The Episode File System"; Proceedings of the 1992 USENIX Winter Technical Conference; 1992; (18 pages).

Seltzer, M.L.; "File System Performance and Transaction Support"; University of California at Berkeley, 1992 (131 pages).

* cited by examiner

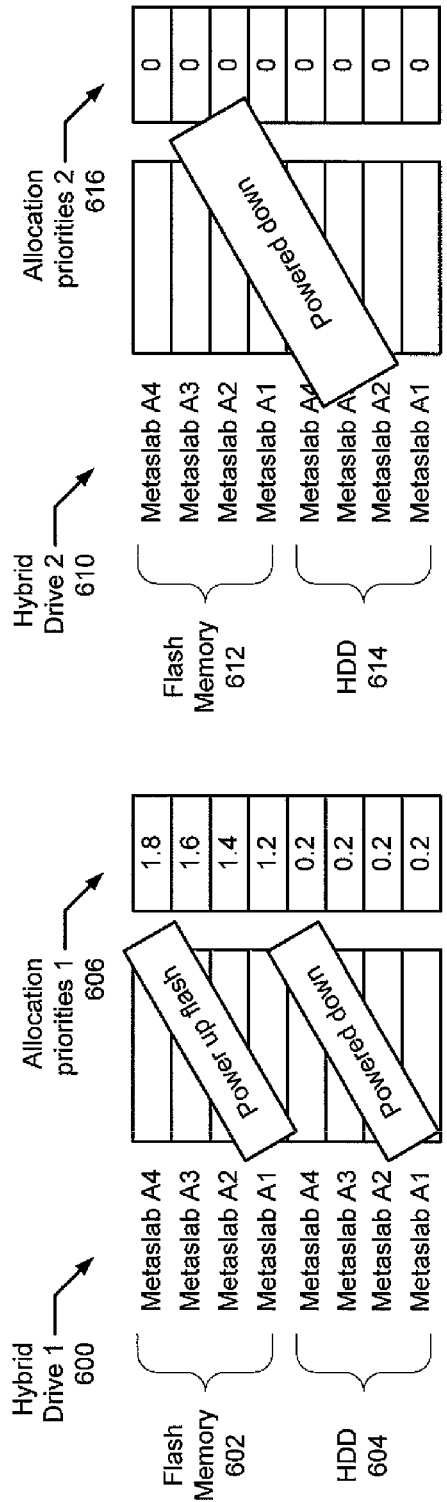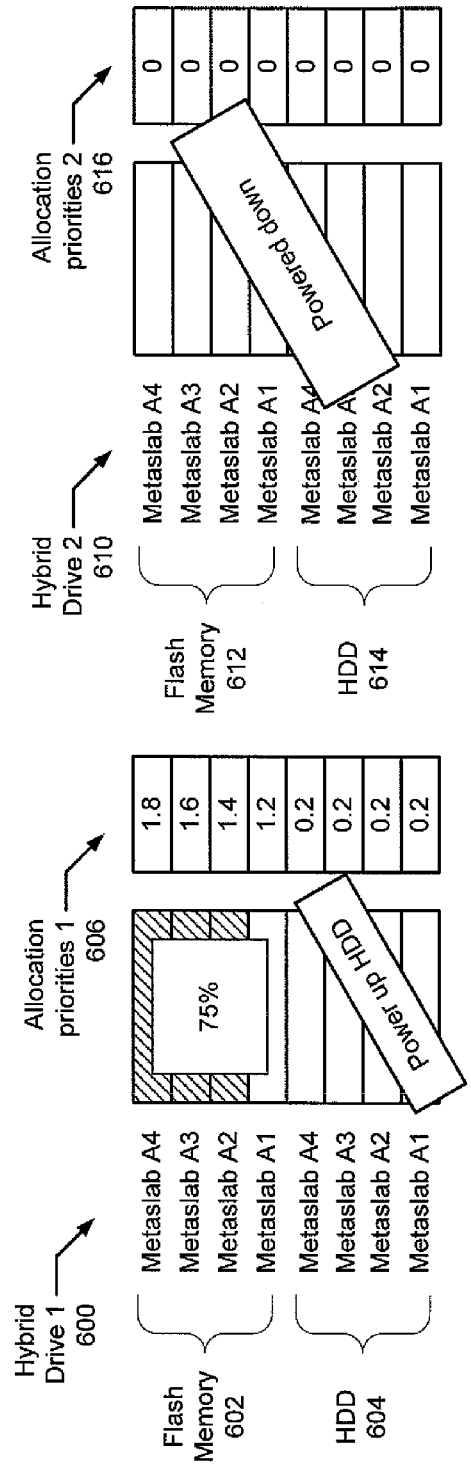

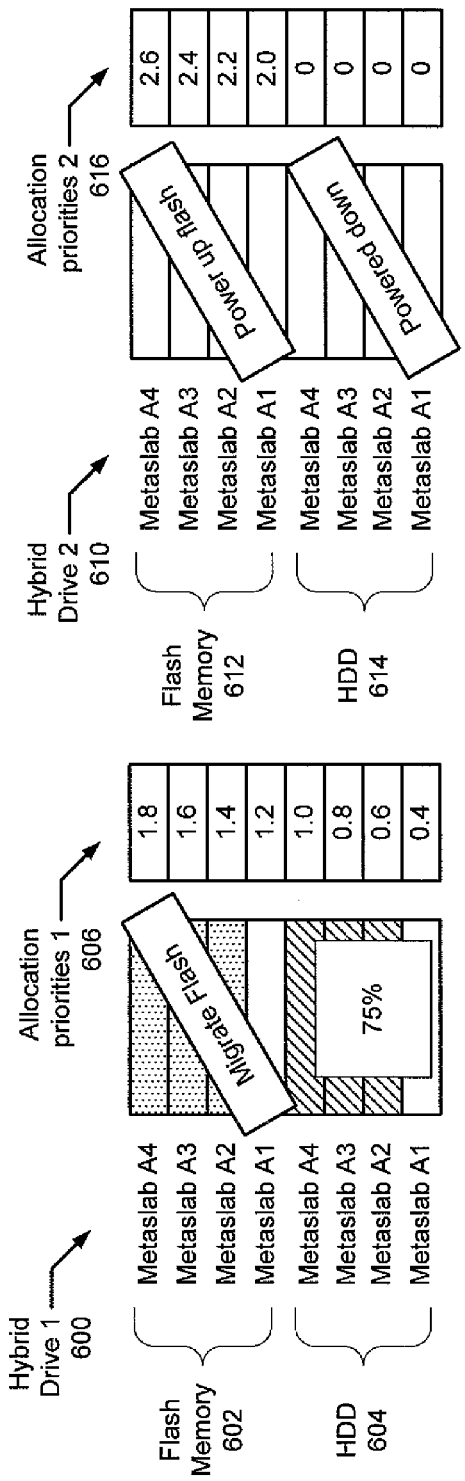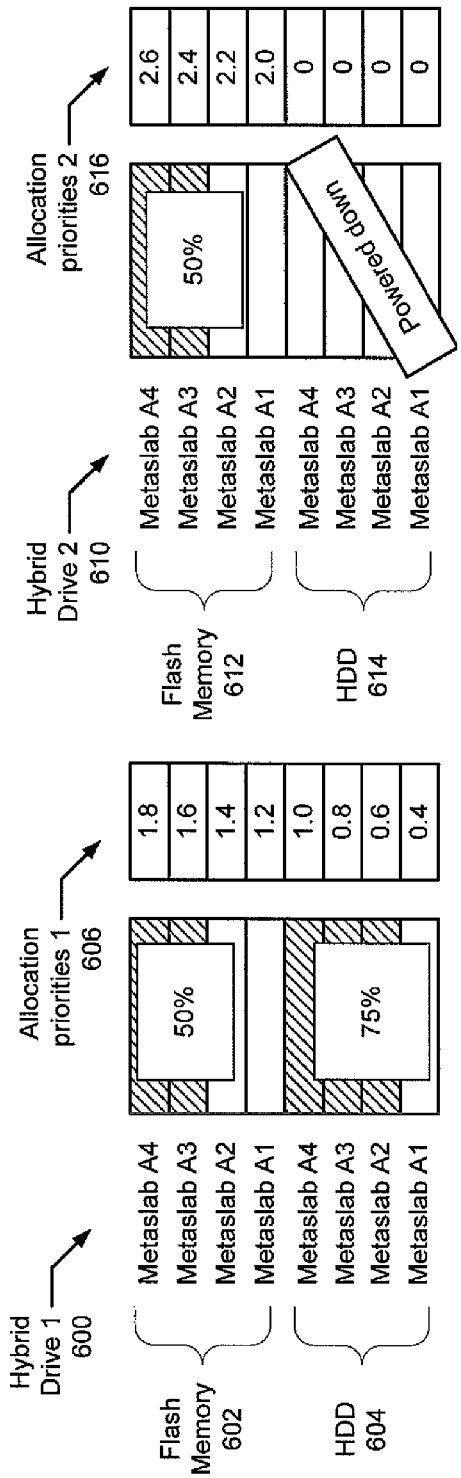
FIGURE 6C
FIGURE 6D

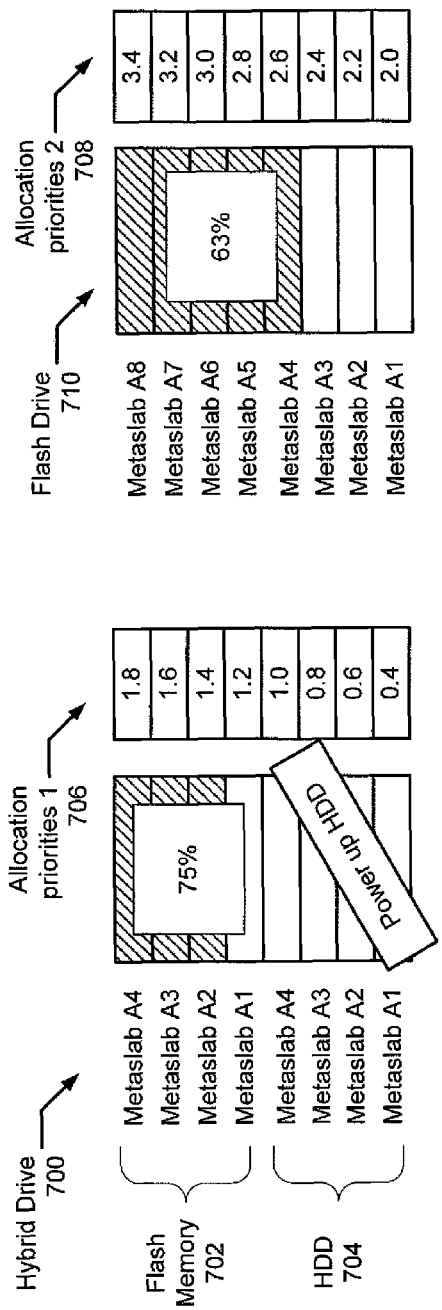
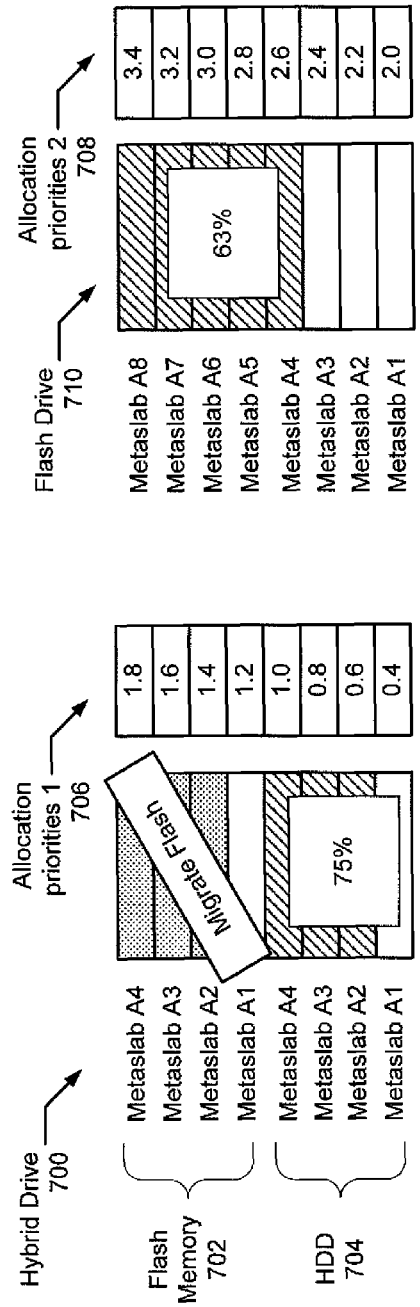
FIGURE 7C
FIGURE 7D

METHOD AND SYSTEM FOR BLOCK ALLOCATION FOR HYBRID DRIVES

CROSS-REFERENCE TO RELATED APPLICATIONS

The present application contains subject matter that may be related to the subject matter in the following U.S. patent applications, which are all assigned to a common assignee: "Method and Apparatus for Self-Validating Checksums in a File System" (application Ser. No. 10/828,573) filed on Apr. 24, 2004; "Method and Apparatus for Dynamic Striping" (application Ser. No. 10/828,677) filed on Apr. 21, 2004; "Method and Apparatus for Vectored Block-Level Checksum for File System Data Integrity" (application Ser. No. 10/828, 715) filed on Apr. 21, 2004; "Method and Apparatus for Identifying Tampering of Data in a File System" (application Ser. No. 10/853,874) filed on May 26, 2004; "Method and System for Detecting and Correcting Data Errors Using Checksums and Replication" (application Ser. No. 10/853, 837) filed on May 26, 2004; "Method and System for Detecting and Correcting Data Errors Using Data Permutations" (application Ser. No. 10/853,870) filed on May 26, 2004; "Method and Apparatus for Compressing Data in a File System" (application Ser. No. 10/853,868) filed on May 26, 2004; "Automatic Conversion of All-Zero Data Storage Blocks into File Holes" (application Ser. No. 10/853,915) filed on May 26, 2004; "Gang Blocks" (application Ser. No. 10/919,878) filed on Aug. 17, 2004; "Method and Apparatus for Enabling Adaptive Endianness" (application Ser. No. 10/919,886) filed on Aug. 17, 2004; "Method and System for Data Replication" (application Ser. No. 11/434,296) filed on May 15, 2006; "Multiple Replication Levels with Pooled Devices" (application Ser. No. 11/406,956) filed on Apr. 19, 2006; "Method and System for Per-File and Per-Block Replication" (application Ser. No. 11/406,850) filed on Apr. 19, 2006; "Method and System for Dirty Time Logging" (application Ser. No. 11/407,773) filed on Apr. 19, 2006; "Method and System for Dirty Time Log Directed Resilvering" (application Ser. No. 11/407,744) filed on Apr. 19, 2006; "Method and System for Metadata-Based Resilvering" (application Ser. No. 11/407,719) filed on Apr. 19, 2006; "Method and System for Pruned Resilvering Using a Dirty Time Log" (application Ser. No. 11/409,427) filed on Apr. 19, 2006; "Method and System Using Checksums to Repair Data" (application Ser. No. 11/406,756) filed on Apr. 19, 2006; "Method and System for Repairing Partially Damaged Blocks" (application Ser. No. 11/406,578) filed on Apr. 19, 2006; "Method and System for Storing a Sparse File Using Fill Counts" (application Ser. No. 11/406,592) filed on Apr. 19, 2006; "Method and System for Object Allocation Using Fill Counts" (application Ser. No. 11/408,134) filed on Apr. 20, 2006; "Ditto Blocks" (application Ser. No. 11/406,590) filed on Apr. 19, 2006; "Method and System for Adaptive Metadata Replication" (application Ser. No. 11/406,957) filed on Apr. 19, 2006; "Method and System for Block Reallocation" (application Ser. No. 11/409,435) filed on Apr. 19, 2006; "Method and System for Using a Block Allocation Policy" (application Ser. No. 11/407,637) filed on Apr. 20, 2006; "Block-Based Incremental Backup" (application Ser. No. 11/432,067) filed on May 11, 2006; "Unlimited File System Snapshots and Clones" (application Ser. No. 11/513, 800) filed on Aug. 31, 2006; "Reflecting Bandwidth and Priority in Network Attached Storage I/O" (application Ser. No. 11/489,936) filed on Jul. 20, 2006; "Method and System for Power-Managing Storage Devices in a Storage Pool" Ser. No. 11/591,234 filed on Oct. 31, 2006; and "Method and System for Reallocating Blocks in a Storage Pool" Ser. No. 11/591,422 filed on Oct. 31, 2006; and "Method and System for Priority-Based Allocation in a Storage Pool" Ser. No. 11/591,425 filed on Oct. 31, 2006.

BACKGROUND

A typical operating system includes a file system. The file system provides a mechanism for the storage and retrieval of files and a hierarchical directory structure for the naming of multiple files. More specifically, the file system stores information provided by a user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk.

To access a file, the operating system (via the file system) typically provides file manipulation interfaces to open, close, read, and write the data within each file. More specifically, the file system stores data on the storage device by managing the allocation of space within the storage device. Typically, the volume manager provides space which is managed by the file system. Two common types of file system space allocation strategies are known as block-based allocation and extent-based allocation. Block-based allocation creates incremental disk space for each file each time the file is extended (i.e., modified via a write request to add information), whereas extent-based allocation creates a large series of contiguous blocks (i.e., extents) each time the file exhausts the space available in the file's last extent.

When allocating space, both block-based and extent-based allocation use space provided by the volume manager. The volume manager allows multiple physical disks to be used as a single volume (i.e., a virtual disk) to provide larger consolidated storage sizes and simpler management. The volume manager allows users to organize data along volume boundaries (i.e., each volume has physical disk space allocated to the volume such that the volume is tied only to that dedicated physical disk). The volume manager is typically implemented as a separate layer between the physical disks and the file system, and is presented to the user as a virtual disk device. In other words, volume managers organize the collections of physical devices (e.g., disks) into virtual devices. Additionally, the space allocated within the volume manager is handled by the file system. Consequently, the volume manager is not aware of which blocks within the available storage space are in use and which blocks are free for data to be stored.

Further, file systems may be mounted on the virtual disk devices. Thus, physical disks are partitioned and allocated to multiple virtual disk devices, and each virtual disk device is capable of having a file system that exclusively uses that particular virtual disk device. A request to access a file is typically performed by an application, via the file system, using a file name and logical offset. This file name and logical offset (i.e., the manner in which applications express file operation requests) corresponds to a location within the virtual disk device. Subsequently, the request is translated to physical disk space on the storage device by the volume manager, allowing the user of the application to access the data within a particular file.

Typically, to add a disk to a volume, all data stored on the volume is backed up to an alternate location (i.e., another volume or any other alternate storage device outside of the volume). The volume is then destroyed and subsequently recreated with the new disk. Finally, the backed up data is transferred back onto the recreated volume. To avoid the need to recreate a volume when a disk is added to the volume, volumes are frequently over-provisioned. That is, a volume may be created using more disks than are initially needed. Thus, the disks are always available for use in the volume, whether or not the storage capacity of the disks is actually needed.

SUMMARY

In general, in one aspect, the invention relates to a method for priority-based allocation in a storage pool, comprising receiving a first request to write a first data item in the storage pool, wherein the storage pool comprises a first hybrid drive comprising a first plurality of metaslabs associated with a first storage type and a second plurality of metaslabs associated with a second storage type, and wherein each of the first and second plurality of metaslabs comprises a contiguous region of data, selecting a first target metaslab from the first and second plurality of metaslabs based on a first plurality of allocation priorities, wherein the first plurality of allocation priorities are determined using a storage and power management policy, a storage characteristic and a power characteristic associated with the first storage type and the second storage type in the first hybrid drive, allocating a first block to the first target metaslab, and writing, after allocating, the first block to the first target metaslab, wherein the first block comprises a first portion of the first data item.

In general, in one aspect, the invention relates to a system for priority-based allocation in a storage pool, comprising a storage pool comprising a first hybrid drive, wherein the first hybrid drive comprises a first plurality of metaslabs associated with a first storage type and a second plurality of metaslabs associated with a second storage type, wherein each of the plurality of metaslabs comprises a contiguous region of data, a first plurality of allocation priorities, wherein the first plurality of allocation priorities is associated with the first and second plurality of metaslabs, and a file system configured to receive a request to write a data item in the storage pool, selecting a first target metaslab from the first and second plurality of metaslabs based on a first plurality of allocation priorities, wherein the first plurality of allocation priorities are determined using a storage and power management policy, a storage characteristic and a power characteristic associated with the first storage type and the second storage type in the first hybrid drive, allocate a block to the target metaslab, and write the block to the target metaslab, wherein the block comprises a portion of the data item.

In general, in one aspect, the invention relates to a computer readable medium comprising computer readable program code embodied therein for causing a computer system to receive a first request to write a first data item in the storage pool, wherein the storage pool comprises a first hybrid drive comprising a first plurality of metaslabs associated with a first storage type and a second plurality of metaslabs associated with a second storage type, and wherein each of the first and second plurality of metaslabs comprises a contiguous region of data, selecting a first target metaslab from the first and second plurality of metaslabs based on a first plurality of allocation priorities, wherein the first plurality of allocation priorities are determined using a storage and power management policy, a storage characteristic and a power characteristic associated with the first storage type and the second storage type in the first hybrid drive, allocate a first block to the first target metaslab, and writing, after allocating, the first block to the first target metaslab, wherein the first block comprises a first portion of the first data item.

Other aspects of the invention will be apparent from the following description and the appended claims.

BRIEF DESCRIPTION OF DRAWINGS

FIGS. 6A-6D and 7A-7D show examples of writing data to a storage pool in accordance with one embodiment of the invention.

DETAILED DESCRIPTION

Figure 1:
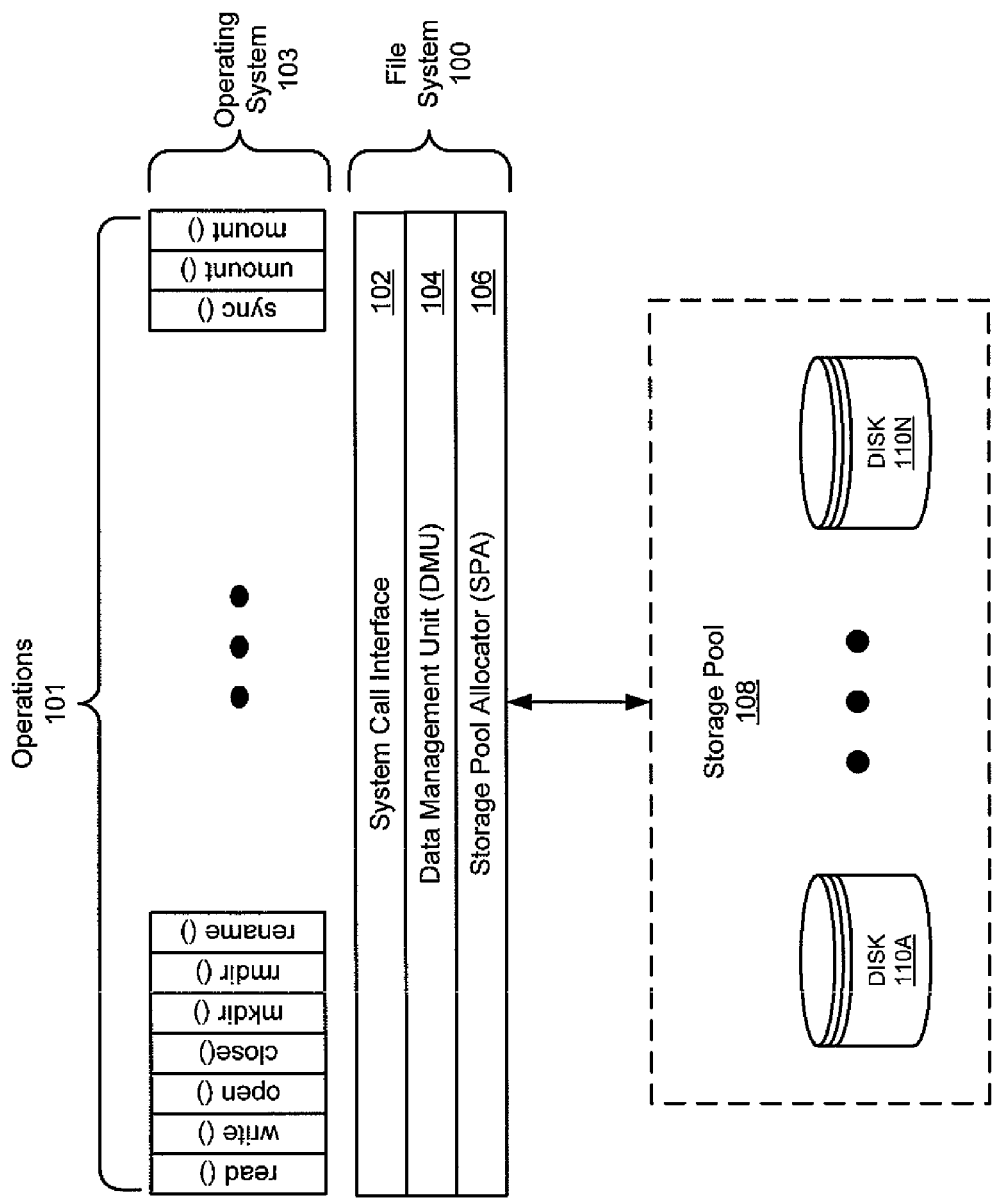
FIG. 1 shows a diagram of a system architecture in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for block placement in storage pool that includes hybrid drives. In particular, each of the hybrid drives includes metaslabs, where the metaslabs are associated with allocation priorities. When a request to write a data item (one or more data blocks or indirect blocks) to the storage pool is received, a block is allocated in a target metaslab (i.e., one of the metaslabs in the storage pool), and at least a portion of the data item is written to the allocated target metaslab. In one or more embodiments of the invention, the target metaslab is determined by considering characteristics of the physical storage devices in the storage pool (including hybrid drives), user-defined storage management policies, and the type of data being written to the storage pool.

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into I/O requests allowing related blocks to be forwarded to the SPA (106) together. The SPA (106) receives transactions from the DMU (106) and subsequently writes the blocks into the storage pool (108). The operation of the SPA (106) is described in FIG. 2A below.

In one embodiment of the invention, the storage pool (108) includes one or more physical disks (disks (110A-110N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2A:
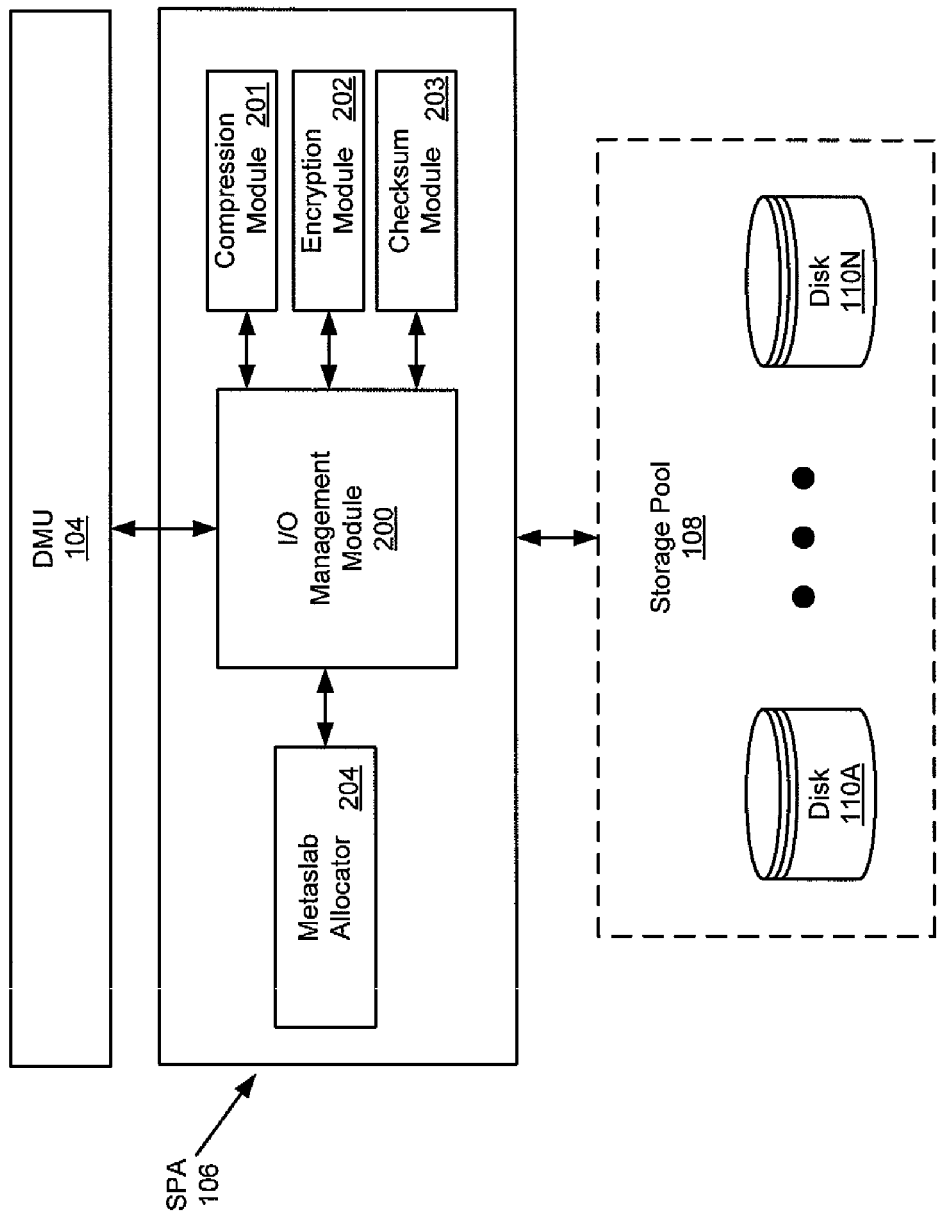
FIG. 2A shows a diagram of a storage pool allocator in accordance with one embodiment of the invention.

FIG. 2A shows the SPA (106) in accordance with one embodiment of the invention. The SPA (106) may include an I/O management module (200), a compression module (201), an encryption module (202), a checksum module (203), and a metaslab allocator (204). Each of these aforementioned modules in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8K bytes may be compressed to a size of 2K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator may include a policy that specifies a method to allocate segments.

Figure 2B:
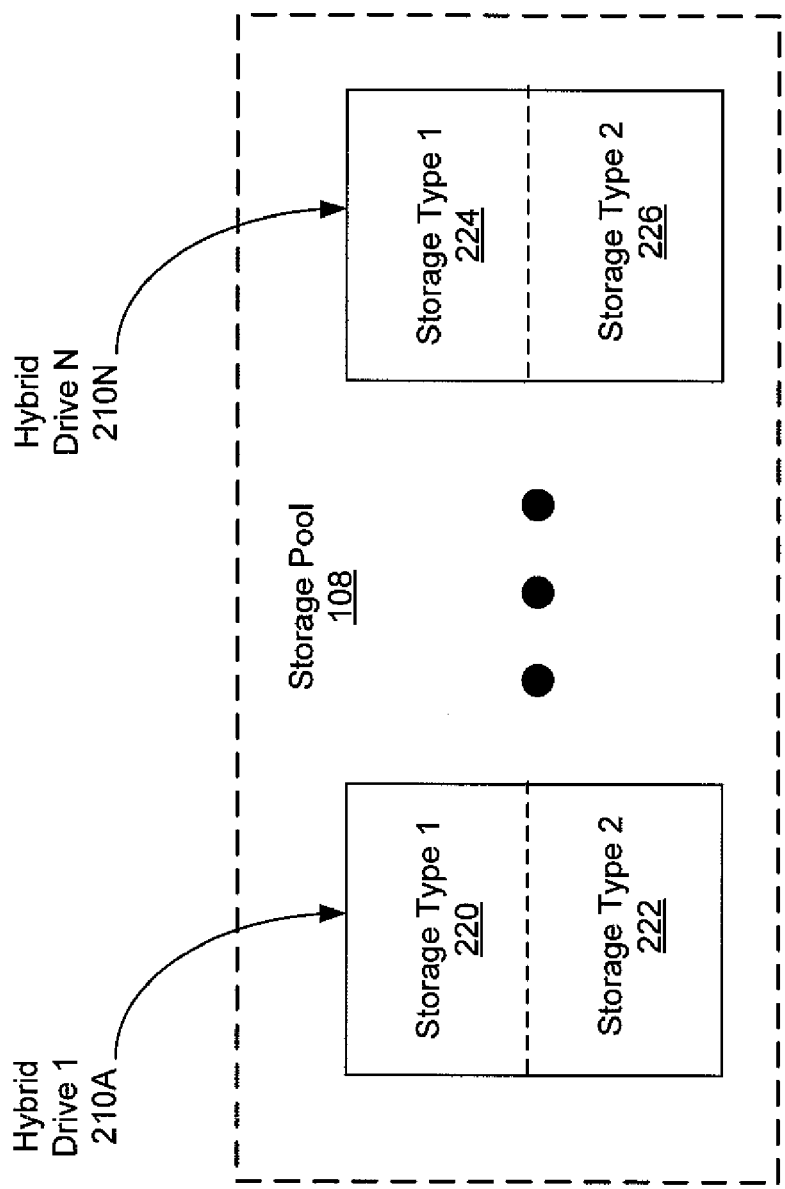
FIG. 2B shows a hybrid drive in accordance with one embodiment of the invention.

FIG. 2B shows the storage pool (108) including hybrid drives (Hybrid Drive 1 (210A), Hybrid Drive N (210N)) in accordance with one or more embodiments of the invention. A hybrid drive (210A, 210N) is a storage device that includes at least two different types of storage in a single drive. For example, as shown in FIG. 2B, Hybrid Drive 1 (210A) includes Storage Type 1 (220) and Storage Type 2 (222). In one or more embodiments of the invention, Storage Type 1 (220) may correspond to flash memory, and Storage Type 2 (222) may correspond to a magnetic hard disk drive (HDD). Alternatively, Storage Type 1 (220) may include an optical disc, while Storage Type 2 (222) may include magnetic storage. Those skilled in the art will appreciate that hybrid drives may include any of the various different types of storage capacities, including but not limited to, solid state storage (e.g., flash memory, etc.), magnetic storage (e.g., hard disk, floppy disk, tape drive, magnetic core memory, thin film memory, drum memory, etc.), optical storage (e.g., compact disc, laserdisc, magneto-optical drive, digital versatile disc (DVD), Blu-ray disc (BD), ultra density optical (UDO) disc, etc.), any other similar type of storage device, or any combination thereof. Blu-ray disk (BD) is a registered trademark of the Blu-Ray Disc Association. Further, those skilled in the art will appreciate that hybrid drives may include more than two different types of storage.

While FIG. 2B shows only hybrid drives in the storage pool (108), those skilled in the art will appreciate that the storage pool may include a combination of traditional physical disk storage (i.e., devices that only include a single storage type) and hybrid drives. In one or more embodiments of the invention, each storage type (220, 222 and 224, 226) in a hybrid drive includes its own set of metaslabs. Further, embodiments of the invention leverage the different power and storage characteristics of the different storage types in a hybrid drive to allocate the physical location of data (i.e., block placement) written to the storage pool.

Figure 3:
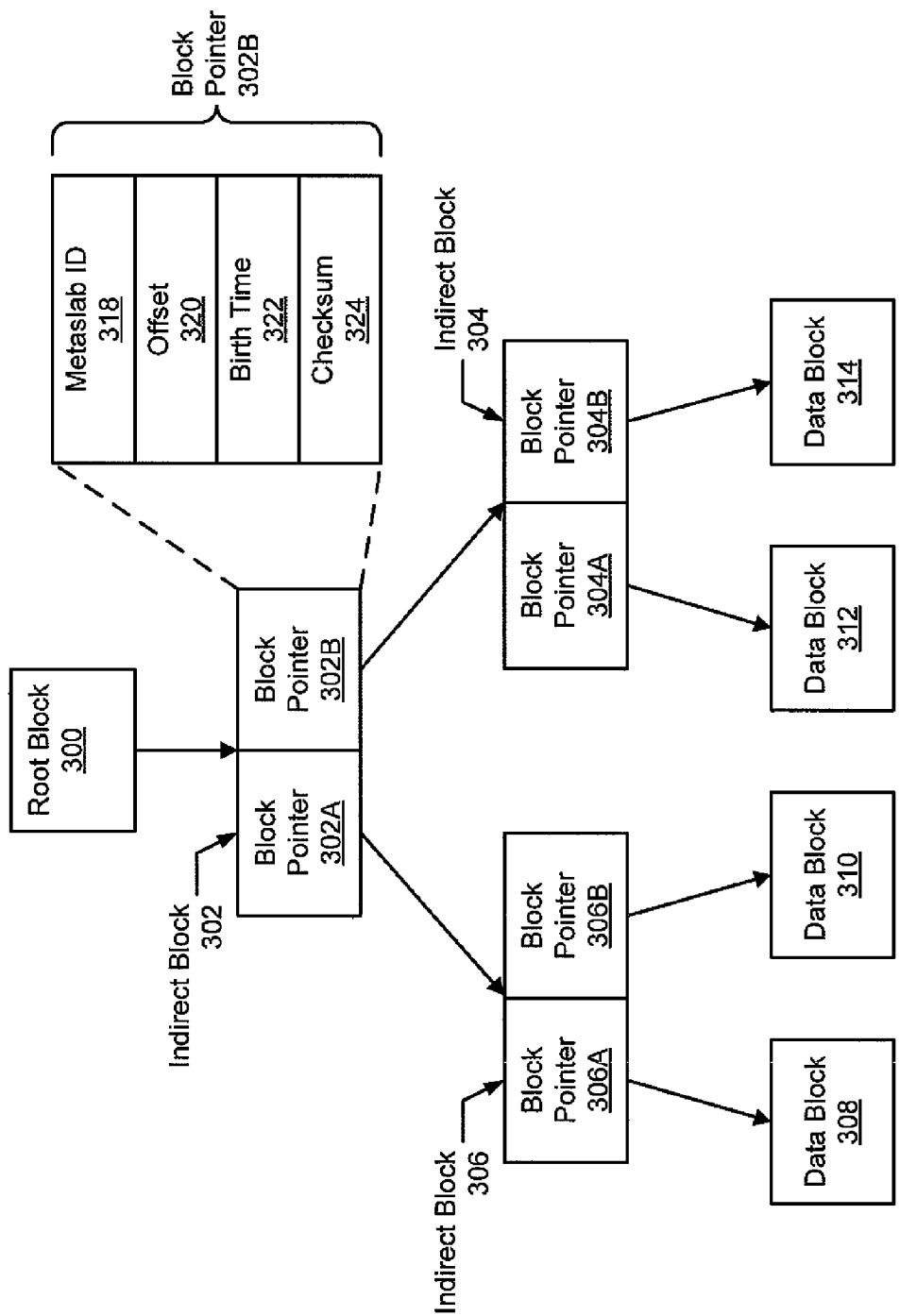
FIG. 3 shows a diagram of a hierarchical data configuration in accordance with one embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306).

In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) include actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather, data blocks include actual data of files within the file system.

In one embodiment of the invention, each block pointer includes a metaslab ID (318), an offset (320) within the metaslab, a birth value (322) of the block referenced by the block pointer, and a checksum (324) of the data stored in the block (data block or indirect block) referenced by the block pointer. In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks, which include the block pointers, are typically written one level at a time. To complete the copy-on-write transaction, the SPA issues a single write that atomically changes the root block to reference the indirect blocks referencing the modified data block.

Figure 4:
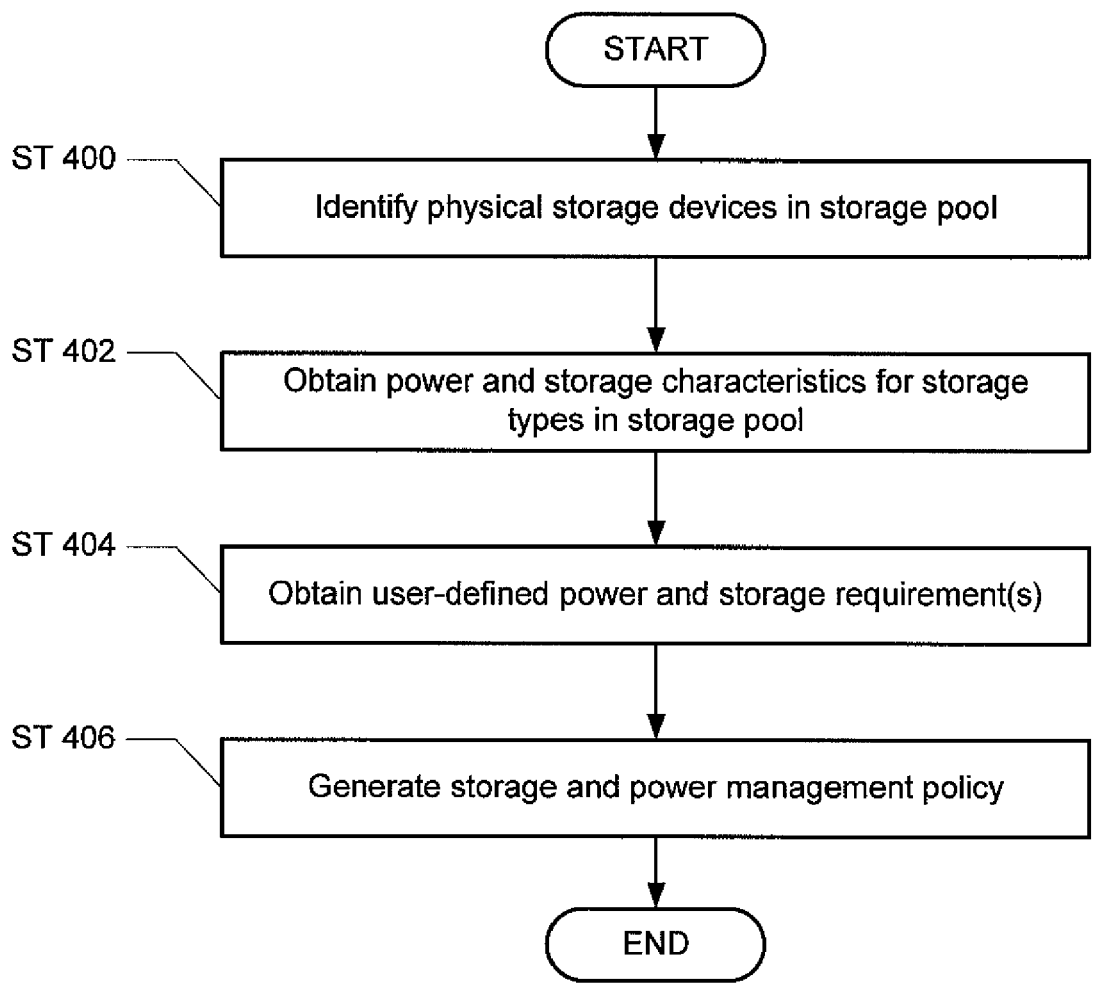
FIGS. 4-5 show flow charts in accordance with one embodiment of the invention.

Using the infrastructure described above in relation to FIGS. 1, 2A-2B, and 3, the following discussion describes a method for block allocation in a storage pool that includes hybrid drives in accordance with one embodiment of the invention. FIG. 4 shows a flow chart for determining a storage and power management policy in accordance with one embodiment of the invention. In one embodiment of the invention, one or more of the steps discussed below may be omitted, repeated, and/or performed in a different order than the order shown in FIG. 4. Accordingly, the specific arrangement of steps shown in FIG. 4 should not be construed as limiting the scope of the invention.

In ST 400, physical storage devices in the storage pool are identified. For example, identifying the storage devices in the storage pool may involve initializing and configuring the storage pool to recognize the storage devices within the storage pool. Further, identification of the storage devices may include determining the storage type(s) of the storage within the storage devices. For example, a storage device may be identified as a hybrid drive that includes 100 megabytes of flash memory and 10 gigabytes of magnetic media.

In ST 402, storage and power characteristics for the identified types of storage devices are obtained (ST 402). Storage characteristics may include, but are not limited to, disk platter speeds, density, disk spin up time, rotational latency, cylinder location, available capacity, or any combination thereof. Power characteristics may include, but are not limited to, available power states (off, power save; half-speed, full speed, etc.), power state transition latencies, power consumption at each of the available power states. In one or more embodiments of the invention, hybrid drives may include different storage and power characteristics for each of storage types in the hybrid drive. For example, for a hybrid drive that includes flash memory and a traditional HDD, the flash portion of the hybrid drive may include a subset of the aforementioned characteristics, and potentially other relevant characteristics). Because flash memory is typically quicker to access and faster to bring on-line than traditional HDDs, the flash portion of the hybrid drive may be leveraged for during block allocation.

In ST 404, user-defined power and storage requirement(s) are obtained, In one or more embodiments of the invention, user-defined power and storage requirements may be in the form of general usage policies or specific performance, power, and/or utilization thresholds. For example, a user may designate that flash memory is to be used until the available flash memory is less than 30% of the total flash memory capacity. At such time, the magnetic storage is used to store data (which may include indirect block and/or data blocks). As another example, a user may specify a maximum power consumption of the storage pool. In such cases, storage devices with lower power consumption are favored over storage devices with higher power consumption. Allocation priorities may alternatively be based on access latencies, seek times, platter speeds, any other similar type of performance or power characteristic, or any combination thereof.

In ST 406, a storage and power management policy is generated based on the user-defined power and storage requirements and the power and storage characteristics associated with the identified storage types in the storage pool. More specifically, the user defined requirements and the inherent storage characteristics of different storage types identified in the storage pool are combined to specify a policy for block allocation in the storage pool when writing data.

Alternatively, there may be a number of different storage and power management policy available and ST401-404 may be used to determine which of the storage and power management policies to use. For example, one storage and power management policy may specify power consumption a maximum power consumption (e.g., in kilowatt hours) for the storage pool for different times during the day. The information collected in ST401-404 may be used to enforce the storage and power management policy.

In one or more embodiments of the invention, the storage and power management policy is used to determine allocation priorities (i.e., weights) assigned to available metaslabs in the storage pool. Specifically, in one embodiment of the invention, to write a block of the data item, a location in the storage pool to write the block to is selected. As noted above, the storage pool may be divided into metaslabs. In one embodiment of the invention, a target metaslab to which to write the block is determined by comparing allocation priorities associated with the metaslabs. Specifically, in one embodiment of the invention, each metaslab may be associated with an allocation priority, and the target metaslab may be the metaslab having the highest allocation priority. If two or more metaslabs have identical allocation priorities, and each of the identical allocation priorities corresponds to the highest allocation priority, the metaslab to use as the target metaslab may be determined by randomly selecting one of the metaslabs that have identical allocation priorities. Alternatively, block writes may be alternated between the metaslabs that have identical allocation priorities. In one embodiment of the invention, the allocation priorities are numbers, characters, bit fields, bit arrays, any other similar type of value, or any combination thereof.

For example, if the storage and power management policy is based on an educing power consumption in the storage pool, the metaslab with the highest allocation priority is the metaslab (i.e., of the available metaslabs) with the lowest power consumption. Further, in one embodiment of the invention, the allocation priorities may be initially user-assigned, and may be subsequently modified according to a block allocation policy. Alternatively, if the storage and power management policy is based on reducing power consumption in the storage pool, metaslabs on storage devices that consume less power may be assigned higher allocation priorities than metaslabs on storage devices that consume more power. For example, because of the storage and power characteristics of flash memory, the metaslabs associated with flash memory in a hybrid drive or a flash-only drive would typically be associated with a higher allocation priority than metaslabs of other storage types. In one embodiment of the invention, one or more storage devices with higher power consumption may initially be powered down. In such cases, allocation priorities are used to determine when to power up the storage device(s). Those skilled in the art will appreciate that reducing power consumption associated with the storage pool may reduce the cost of operating the storage pool.

Alternatively, in one or more embodiments of the invention, the storage and power management policy is enforced using allocation priorities (i.e., weights) assigned to available metaslabs in the storage pool. For example, if the storage and power management policy specifies a maximum power consumption of the storage pool, the allocation priorities may be set to favor allocation of metaslabs on storage devices (or portions thereof) that consume low amounts of power.

As discussed above, in one embodiment of the invention, a set of allocation priorities is associated with the storage and power management policy. Further, one or more of the allocation priorities may be modified according to the storage and power management policy or when storage devices are added or made available for writing data to the storage pool. For example, an allocation priority associated with a particular metaslab may be decreased when a block is written to the metaslab. As another example, an allocation priority associated with a particular metaslab may be increased when a block is deleted from the metaslab.

In one or more embodiments of the invention, allocation priorities for metaslabs on a storage device may be increased or decreased if the power state of the storage device is changed. For example, as a storage device is spun up from being initially powered down, the allocation priorities for the newly available storage device may be higher than other less efficient storage types available in the storage pool. Further, in one embodiment of the invention, allocation priorities may be modified dynamically, e.g., during normal operation of the storage pool. For example, a storage pool allocator (SPA) (e.g., SPA (106) of FIG. 1) may be responsible for managing allocation priorities associated with metaslabs in the storage pool, as conditions in the storage pool change.

Further, in one embodiment of the invention, a heuristic model may be used when modifying allocation priorities. For example, allocation priorities may be slower to decrease than to increase. Specifically, using a heuristic model may help to avoid a scenario in which the relative allocation priorities of two metaslabs alternate frequently, thereby degrading performance of the storage pool. For example, a heuristic model may be used to avoid frequently powering up and powering down the same storage device. Further, a heuristic model may reduce data fragmentation in the storage pool.

Figure 5:
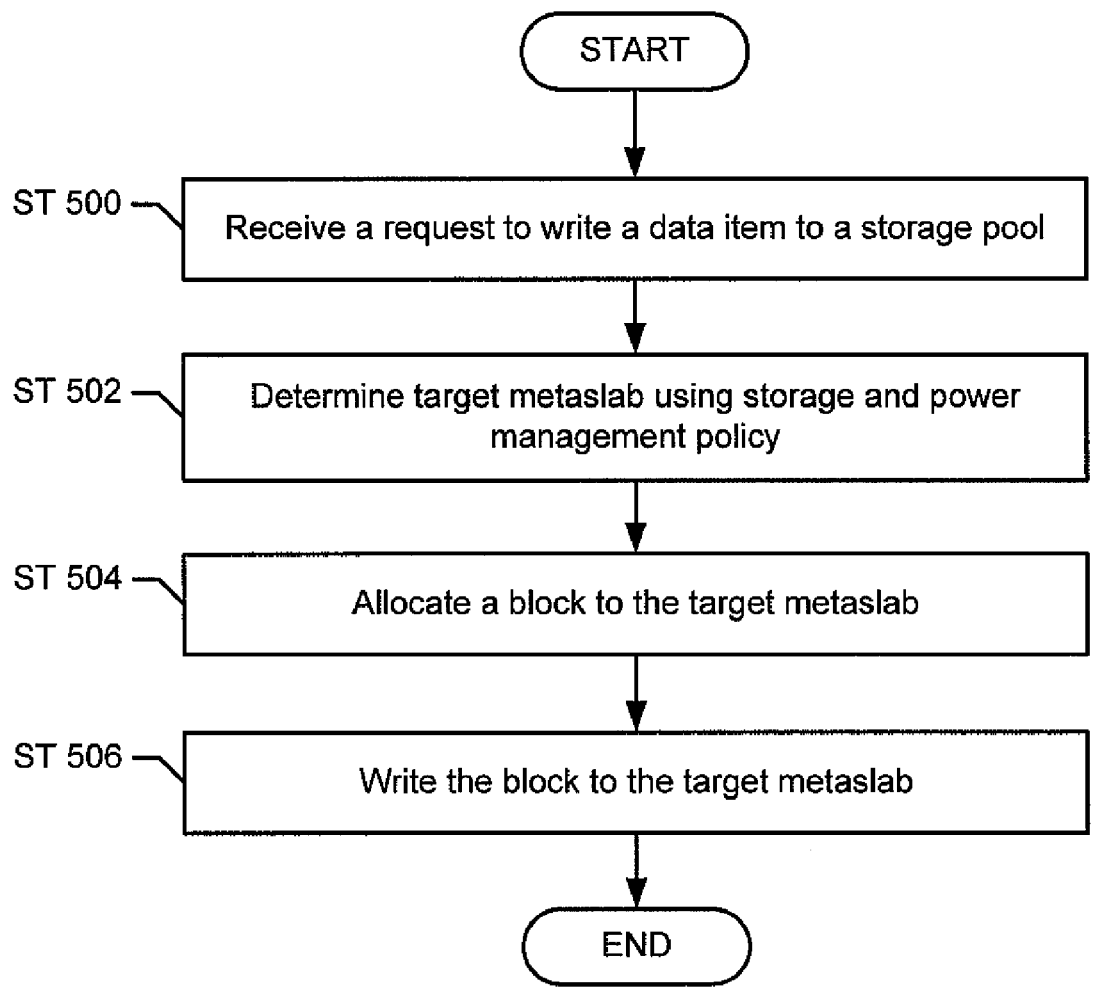

FIG. 5 shows a flow chart for writing data to the storage pool using the allocation priorities in accordance with one or more embodiments of the invention. In one embodiment of the invention, one or more of the steps discussed below may be omitted, repeated, and/or performed in a different order than the order shown in FIG. 5. Accordingly, the specific arrangement of steps shown in FIG. 5 should not be construed as limiting the scope of the invention.

In ST 500, a request to write a data item to a storage pool is received. More specifically, in one embodiment of the invention, the data item is a unit of data that may be written to the storage pool as one or more data blocks and/or indirect blocks, as discussed above. In ST 502, target metaslab is determined using the storage and power management policy. More specifically, allocation priorities of available metaslabs are examined to determine the highest allocation priority metaslab to which data is to be written to comply with the storage and power management policy. In ST 504, one or more blocks are allocated to the target metaslab. In ST 506, the allocated block in the target metaslab is written to, completing the write transaction.

FIGS. 6A-6D show an example of writing data to a storage pool including hybrid drives in accordance with one or more embodiments of the invention. Specifically, in FIGS. 6A-6D, an example is shown in which data may be written to two hybrid drives (Hybrid Drive 1 (600), Hybrid Drive 2 (610)). Further, each metaslab associated with Hybrid Drive 1 (600) and Hybrid Drive 2 (610) includes allocation priorities that may be assigned based on the storage and power management policy as described above.

Consider the scenario in which no data has been written to the storage pool previously. When the first write request is received, the storage pool is initialized to recognize the types of memory storage that are available for writing data, and the storage and power management policy is used to write data to the storage pool. For an initial write request, the flash memory (602) portion of Hybrid Drive 1 (600) is powered up. In one embodiment of the invention, powering down a storage device may involve removing all electrical current to the storage device completely. Alternatively, the storage device may simply be placed in a power-saving mode. For example, a hard disk may be "spun down," i.e., rotation of hard disk platters may be halted. In one embodiment of the invention, the storage device is powered down by issuing a command to a hardware and/or software interface controlling the storage device. For example, a command to power down a hard disk drive may be issued to a hard disk drive controller, using an interface provided by the hard disk drive controller. In the case of a hybrid drive, there may be two or more controllers for the different types of storage within the hybrid drive. Thus, a first storage controller may interface with the flash memory (602) and a second storage controller may interface with the HDD (604).

After the flash memory (602) is completely powered up, data writes are allocated based on the allocation priorities (606) assigned to metaslabs in the flash memory (602) portion of Hybrid Drive 1 (600). For example, metaslab A4 of the flash memory (602) is written to before metaslab A3 is written to, because the allocation priority assigned to metaslab A4 is higher (1.8) than the allocation priority assigned to metaslab A3.

At this stage, Hybrid Drive 2 (610) shown in FIG. 6A is powered down. In one or more embodiments of the invention, a powered down storage device may not be assigned allocation priorities. Thus, in FIG. 6A, the metaslabs located in Hybrid Drive 2 (610) are assigned allocation priorities of zero. The allocation priorities of a powered down storage device may subsequently be modified when the storage device is powered up/spun up. Alternatively, a powered down storage device or storage type may be assigned low allocation priorities that may be adjusted when the storage device/type is powered up. For example, the powered down HDD (604) of Hybrid Drive 1 (600) includes metaslabs with an assigned priority value. In one embodiment of the invention, powering down a storage device reduces power consumption associated with the storage pool. For example, one skilled in the art will appreciate that a spun down hard disk consumes less power than a spun up hard disk. Further, powered up storage devices typically generate more heat than powered down storage devices. Accordingly, powering down a storage device may reduce cooling requirements associated with the storage pool. More generally, powering down a storage device may reduce the cost of operating the storage pool, may reduce environmental impact of the storage pool, and/or may ease operating demands placed on a system administrator and/or infrastructure supporting the storage pool.

In FIG. 6B, seventy-five percent (75%) of the flash memory (602) of Hybrid Drive 1 (600) is full (i.e., includes data). In one or more embodiments of the invention, the storage and power management policy may specify an aggregate utilization level of one or more powered up portions of a storage device in the storage pool. That is, the storage and power management policy may be satisfied when the aggregate utilization level of the storage device(s) reaches a threshold value (e.g., a predefined number of megabytes, a predefined percentage of total storage capacity, etc.). Alternatively, the storage and power management policy may be time-based, i.e., the storage and power management policy may define specific times and/or time intervals when a storage device should be added to the storage pool.

In this case, consider the scenario in which the storage and power management policy specifies an aggregate utilization level threshold value for flash memory of 75%. For example, in one or more embodiments of the invention, the flash memory threshold value may be based on wear-leveling of the flash memory, which allows only a limited number of writes to the flash memory before the flash becomes "worn out," and can no longer be written to. When the flash memory threshold is reached, the HDD (604) may be powered up, as shown in Hybrid Drive 1 (600) in FIG. 6B. Hybrid Drive 2 (610) is still powered down.

Those skilled in the art will appreciate that the HDD (604) may be powered up before the flash memory threshold is actually reached. In this manner, the HDD may be powered up in anticipation of the flash memory threshold being reached, so that data may be migrated from the flash memory to the HDD more efficiently. Further, those skilled in the art will appreciate that, in addition to the considerations mentioned above, deciding whether to write to flash memory or more permanent memory may also be based on the type of data being written to the storage pool. For example, smaller, less complex writes may be written to flash memory, while larger, more complex writes may directly be written to the HDD in a hybrid drive.

Continuing with the example shown in FIG. 6, FIG. 6C depicts the migration of the data previously written to flash memory (602) to the HDD (604). More specifically, the flash memory (602) is flushed, in accordance with the storage and power management policy, to the HDD (604), such that the HDD (604) is now 75% full. Alternatively, in one or more embodiments of the invention, the copy-on-write function described above may be used to copy the data written to the flash memory (602) to the HDD (604) and deallocate blocks in the flash memory (602). The deallocated blocks may then be assigned adjusted priorities and written to when new write requests are received. Those skilled in the art will appreciate that the HDD (604) storage of Hybrid Drive 1 (600) may be larger than the flash memory (602) portion, in which case the migrated data may not occupy the same percentage of the HDD (604) as the flash memory (602). In one or more embodiments of the invention, the migration of data from one storage type to another storage type in a hybrid drive may be performed by a background process that operates concurrently with I/O requests that continue to be received and processed by the file system.

At this stage, the flash memory (602) storage of Hybrid Drive 1 (600) is available for allocation of data blocks. At the same time, Hybrid Drive 2 (610) may be powered up. Specifically, the flash memory (612) storage of Hybrid Drive 2 (610) may be powered up, while the HDD (614) storage of Hybrid Drive 2 (610) remains powered down. More generally, in one embodiment of the invention, after the storage and power management policy is satisfied, a powered-down storage device (i.e., Hybrid Drive 2 (610)) is powered up. For example, the storage device may be removed from a power-saving mode. The storage device is then made available for use in the storage pool. Thus, in FIG. 6C, two flash memory portions (602, 612) are available for storage of data blocks and/or indirect blocks, as described above. Further, allocation priorities 2 (616) for the flash memory (612) of Hybrid Drive 2 (610) are modified to have higher (or equal) priorities to the flash memory (602) of Hybrid Drive 1 (600).

Because writing to flash memory is generally a more efficient process and consumes less power than writing to a completely powered up HDD, using the two flash memory portions for smaller, less complex data writes allows for and more efficient power consumption by leveraging the storage characteristics of flash memory.

Finally, in FIG. 6D, when both flash memory (602, 612) storage types in each hybrid drive (600, 610) begin to approach threshold values, the HDD (614) of Hybrid Drive 2 (610) may be powered up and made available for storage of data.

Figure 7A:
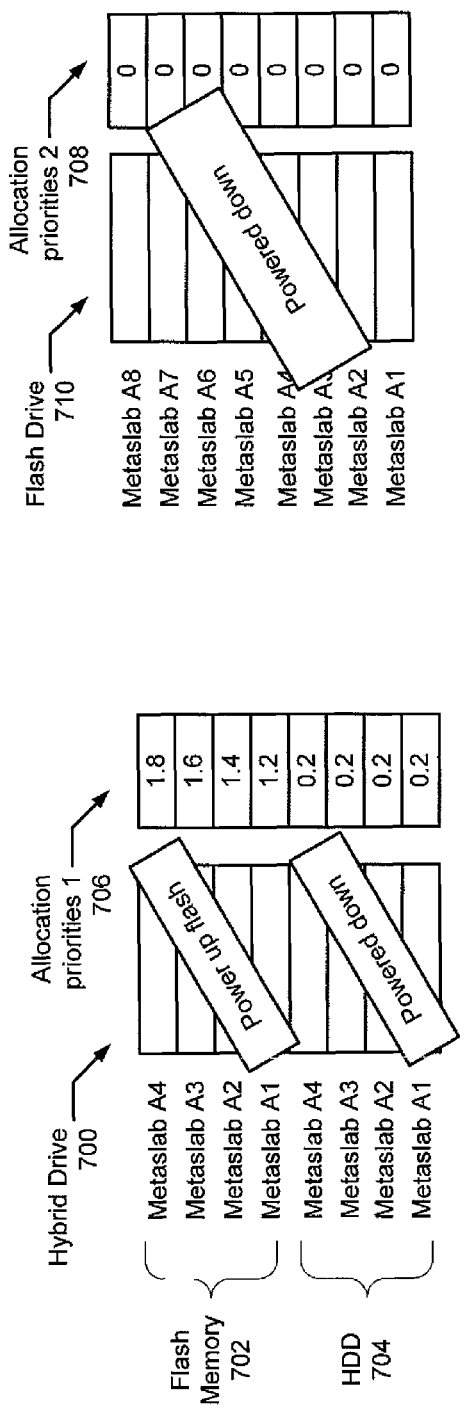

FIGS. 7A-7D show an example writing data to a storage pool including hybrid drives in accordance with one or more embodiments of the invention. In the example of FIGS. 7A-7D, the storage pool includes a hybrid drive (Hybrid Drive 3 (700)) and a flash-only storage drive (Flash Drive (710)). Initially, as shown in FIG. 7A, the flash memory (702) portion of the Hybrid Drive (700) is powered up, while the HDD (704) of the Hybrid Drive (700) and the Flash Drive (710) remain powered down. As described above, once the flash memory (702) is powered up, data is written to the flash memory (702) based on allocation priorities (706) assigned to the metaslabs in the flash memory (702).

Figure 7B:
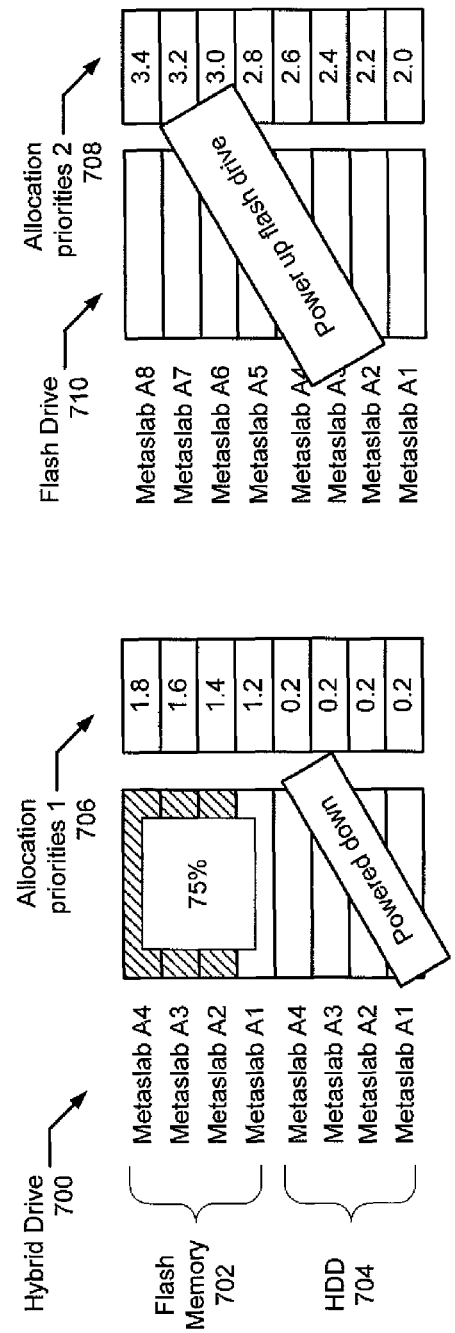

In FIG. 7B, the flash memory (702) of the Hybrid Drive (700) has reached the threshold value (e.g., 75%). At this stage, rather than powering up the HDD (704) of the Hybrid Drive (700), the Flash Drive (710) is powered up. Allocation priorities 2 (708) corresponding to flash memory metaslabs in the Flash Drive (710) are subsequently adjusted, and may be assigned higher priorities than the flash memory (702) of the Hybrid Drive (700) because the Flash Drive (710) includes a larger set of available metaslabs for the allocation of blocks.

FIG. 7C shows the Flash Drive (710) approaching the threshold. In this example, before the threshold is actually reached, in anticipation of needing additional storage devices, the HDD (704) of the Hybrid Drive (700) is powered up. Although not shown in FIG. 7C, allocation priorities 1 (706) for the metaslabs of the HDD (704) may be adjusted from the initially assigned priority values when the HDD (704) is powered up. Data may subsequently be written to the HDD (704) of the Hybrid Drive (700), while the flash memory (702) of the Hybrid Drive (700) is migrated (or deallocated based on copy-on-write transactions), as shown in FIG. 7D.

Embodiments of the invention provide a method and system for block allocation in a storage pool with multiple types of physical storage devices, including hybrid drives. Using embodiments of the invention, I/O latency may be minimized when writing data to the storage pool by initially allocating blocks on flash portions of hybrid drives. Further, excess capacity drives (or a portion of the drives) can be spun-down until needed, at which point they are dynamically brought on-line. Less on-line drives combined with user-defined policies for storage and power management can be used to tune a system as desired and decrease power consumption.

Figure 8:
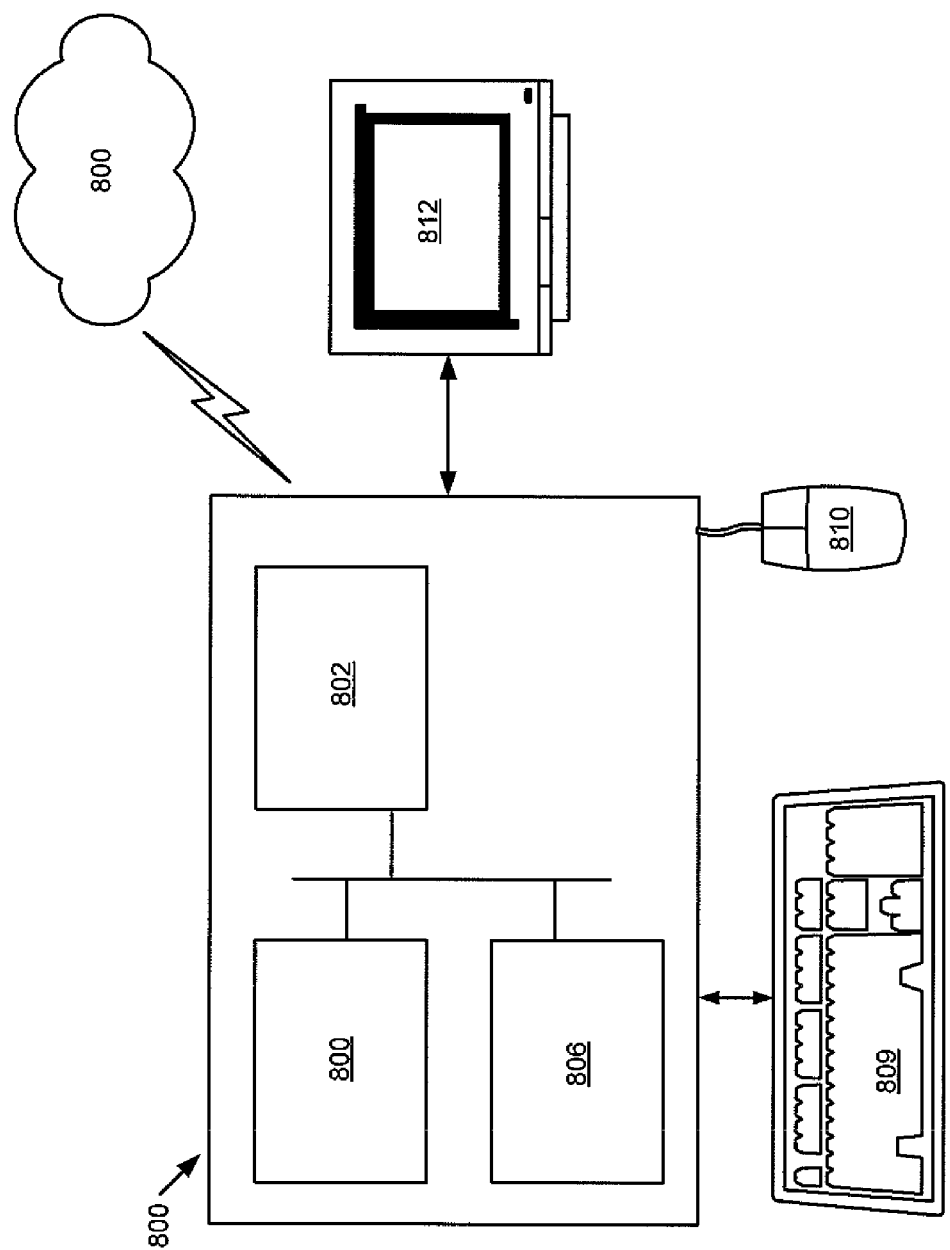
FIG. 8 shows a diagram of a computer system in accordance with one embodiment of the invention.

Embodiments of the invention may be implemented on virtually any type of computer regardless of the platform being used. For example, as shown in FIG. 8, a computer system (800) includes a processor (802), associated memory (804), a storage device (806), and numerous other elements and functionalities typical of today's computers (not shown). The computer (800) may also include input means, such as a keyboard (808) and a mouse (810), and output means, such as a monitor (812). The computer system (800) may be connected to a network (814) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (800) may be located at a remote location and connected to the other elements over a network. Further, embodiments of the invention may be implemented on a distributed system having a plurality of nodes, where each portion of the invention (e.g., operating system, file system, storage pool, disk, system call interface, data management unit, storage pool allocator, metaslab allocator, I/O management module, compression module, encryption module, checksum module, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on any tangible computer readable medium such as a compact disc (CD), a diskette, a tape, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for priority-based allocation in a storage pool, comprising:
   receiving a first request to write a first data item in the storage pool,
      wherein the storage pool comprises a first hybrid drive comprising a first plurality of metaslabs associated with a first storage type and a second plurality of metaslabs associated with a second storage type, and
      wherein each of the first and second plurality of metaslabs comprises a contiguous region of data;
   selecting a first target metaslab from the first and second plurality of metaslabs based on a first plurality of allocation priorities, wherein the first plurality of allocation priorities are determined using a storage and power management policy, a storage characteristic, and a power characteristic associated with the first storage type and the second storage type in the first hybrid drive;
   allocating a first block to the first target metaslab;
   writing, after allocating, the first block to the first target metaslab, wherein the first block comprises a first portion of the first data item;
   powering up a second hybrid drive in the storage pool, wherein the second hybrid drive comprises a third plurality of metaslabs associated with a third storage type and a fourth plurality of metaslabs associated with a fourth storage type, wherein the fourth storage type of the second hybrid drive is initially powered down and is powered up after a threshold value of the third storage type is reached;
   assigning a second plurality of allocation priorities to each of the third and fourth plurality of metaslabs;
   adjusting the first plurality of allocation priorities based on storage and power characteristics of the third and fourth storage types of the second hybrid drive to obtain an adjusted first plurality of allocation priorities;
   selecting a second target metaslab from the first, second, and third, plurality of metaslabs by comparing the adjusted first and second plurality of allocation priorities;
   allocating a second block to the second target metaslab; and
   writing the second block to the second target metaslab, wherein the second block comprises a second portion of the first data item.

2. The method of claim 1, further comprising:
   selecting a second target metaslab from the first and second plurality of metaslabs based on the adjusted first plurality of allocation priorities;
   allocating a second block to the second target metaslab; and
   writing the second block to the second target metaslab, wherein the second block comprises a second portion of the first data item.

3. The method of claim 1, wherein the first storage type is a flash memory and the second storage type is a hard disk drive.

4. The method of claim 3, wherein the first plurality of metaslabs associated with the flash memory is assigned higher allocation priorities than the second plurality of metaslabs associated with the hard disk drive.

5. The method of claim 1,
wherein the storage characteristic comprises at least one selected from the group consisting of disk platter speeds, density, disk spin up time, rotational latency, cylinder location, available capacity, and
wherein the power characteristic comprises at least one selected from the group consisting of available power states, power state transition latencies, and power consumption at each of the power states.

6. The method of claim 1, further comprising:
modifying the adjusted first plurality of allocation priorities assigned to the first hybrid drive based on a change in a power state of a storage device in the storage pool.

7. A system for priority-based allocation in a storage pool, comprising:
a storage pool comprising a first hybrid drive, wherein the first hybrid drive comprises a first plurality of metaslabs associated with a first storage type and a second plurality of metaslabs associated with a second storage type, wherein each of the plurality of metaslabs comprises a contiguous region of data;
a first plurality of allocation priorities, wherein the first plurality of allocation priorities is associated with the first and second plurality of metaslabs; and
a file system configured to:
receive a request to write a data item in the storage pool;
selecting a first target metaslab from the first and second plurality of metaslabs based on a first plurality of allocation priorities, wherein the first plurality of allocation priorities are determined using a storage and power management policy, a storage characteristic and a power characteristic associated with the first storage type and the second storage type in the first hybrid drive;
allocate a block to the target metaslab;
write the block to the target metaslab, wherein the block comprises a portion of the data item;
power up a third storage type in a second hybrid drive in the storage pool, wherein the second hybrid drive comprises a third plurality of metaslabs associated with the third storage type and a fourth plurality of metaslabs associated with a fourth storage type, wherein the fourth storage type of the second hybrid drive is initially powered down and is powered up after a threshold value of the third storage type is reached;
assign a second plurality of allocation priorities to each of the third and fourth plurality of metaslabs;
adjust the first plurality of allocation priorities based storage and power characteristics of the third and fourth storage types of the second hybrid drive to obtain an adjusted first plurality of allocation priorities;
select a second target metaslab from the first, second, and third, plurality of metaslabs by comparing the adjusted first and second plurality of allocation priorities;
allocate a second block to the second target metaslab; and
write the second block to the second target metaslab, wherein the second block comprises a second portion of the first data item.

8. The system of claim 7, wherein the first storage type is a flash memory and the second storage type is a hard disk drive.

9. The system of claim 7,
wherein the storage characteristic comprises at least one selected from the group consisting of disk platter speeds, density, disk spin up time, rotational latency, cylinder location, available capacity, and wherein the power characteristic comprises at least one selected from the group consisting of available power states, power state transition latencies, and power consumption at each of the power states.

10. A computer readable storage medium comprising computer readable program code embodied therein for causing a computer system to:
receive a first request to write a first data item in the storage pool,
wherein the storage pool comprises a first hybrid drive comprising a first plurality of metaslabs associated with a first storage type and a second plurality of metaslabs associated with a second storage type, and
wherein each of the first and second plurality of metaslabs comprises a contiguous region of data;
selecting a first target metaslab from the first and second plurality of metaslabs based on a first plurality of allocation priorities, wherein the first plurality of allocation priorities are determined using a storage and power management policy, a storage characteristic and a power characteristic associated with the first storage type and the second storage type in the first hybrid drive;
allocate a first block to the first target metaslab;
writing, after allocating, the first block to the first target metaslab, wherein the first block comprises a first portion of the first data item;
powering up a third storage type in a second hybrid drive in the storage pool, wherein the second hybrid drive comprises a third plurality of metaslabs associated with the third storage type and a fourth plurality of metaslabs associated with a fourth storage type, wherein the fourth storage type of the second hybrid drive is initially powered down and is powered up after a threshold value of the third storage type is reached;
assigning a second plurality of allocation priorities to each of the third and fourth plurality of metaslabs;
adjusting the first plurality of allocation priorities based on storage and power characteristics of the third and fourth storage types of the second hybrid drive to obtain an adjusted first plurality of allocation priorities;
selecting a second target metaslab from the first and second plurality of metaslabs by comparing the adjusted first and second plurality of allocation priorities;
allocate a second block to the second target metaslab; and
write the second block to the second target metaslab, wherein the second block comprises a second portion of the first data item.

11. The computer readable storage medium of claim 10,
wherein the storage characteristic comprises at least one selected from the group consisting of disk platter speeds, density, disk spin up time, rotational latency, cylinder location, available capacity, and
wherein the power characteristic comprises at least one selected from the group consisting of available power states, power state transition latencies, and power consumption at each of the power states.

12. The computer readable storage medium of claim 10, wherein the third storage type and the first storage type are identical.

13. The computer readable storage medium of claim 10, wherein the third storage type and the first storage type are identical and wherein the fourth storage type and the second storage type are identical.

* * * * *